March 18, 1924.

C. H. PLUMMER 1,486,918

PROCESS AND MECHANISM FOR PICKING PODS

Filed Jan. 11, 1922    6 Sheets-Sheet 1

FIG. 1.

INVENTOR.
Clarence H. Plummer
BY
Erwin Wheeler & Woolars
ATTORNEYS.

March 18, 1924.

C. H. PLUMMER 1,486,918

PROCESS AND MECHANISM FOR PICKING PODS

Filed Jan. 11, 1922      6 Sheets-Sheet 3

FIG. 3.

INVENTOR.
Clarence H. Plummer
BY
Erwin Wheeler & Woolard
ATTORNEYS

March 18, 1924.

C. H. PLUMMER

1,486,918

PROCESS AND MECHANISM FOR PICKING PODS

Filed Jan. 11, 1922     6 Sheets-Sheet 4

Clarence H. Plummer INVENTOR.

BY

Erwin Wheeler & Woolard ATTORNEYS.

March 18, 1924.                                                1,486,918
C. H. PLUMMER
PROCESS AND MECHANISM FOR PICKING PODS
Filed Jan. 11  1922        6 Sheets-Sheet 5

INVENTOR.
Clarence H. Plummer
BY
Erwin Wheeler & Woolard
ATTORNEYS.

Patented Mar. 18, 1924.

1,486,918

UNITED STATES PATENT OFFICE.

CLARENCE H. PLUMMER, OF KEWAUNEE, WISCONSIN.

PROCESS AND MECHANISM FOR PICKING PODS.

Application filed January 11, 1922. Serial No. 528,411.

*To all whom it may concern:*

Be it known that I, CLARENCE H. PLUMMER, a citizen of the United States, residing at Kawaunee, county of Kewaunee, and State of Wisconsin, have invented new and useful Improvements in Processes and Mechanism for Picking Pods, of which the following is a specification.

This invention relates to a process and mechanism for picking pea pods or other like seed pods of leguminous plants from the vines upon which they grow.

It is the primary object of this invention to provide a practical means for mechanically picking pods from the vines.

Originally in the pea canning industry pea vines were invariably podded by hand and the pods were thereafter threshed at the canning factory. It was then discovered that the peas could be threshed from the pods without removing the pods from the vines by subjecting them to a process in which the vines and pods are batted in free air. This process did not meet with favor immediately because the viners, even in their present state of perfection, are destructive to peas and do not produce the highest grade product. Labor conditions, however, have made it impossible to obtain numbers of workmen sufficient to enable pea vines to be podded by hand and the viners have, therefore, come into general use.

It has been found that the hulled peas, whether separated from the pods by threshing, or by the vining operation above described, are moistened by the sap from the bruised pods and the vines and if allowed to stand for a period greater than an hour and a half, will commence to heat. Peas which have been allowed to heat lose their flavor rapidly and eventually become entirely spoiled.

It is the ordinary practice in the pea canning industry today to surround each canning factory with a number of vining stations distributed throughout the neighboring farm lands. The farmers bring their vines to these stations and the peas are there threshed from the vines and pods and are taken ready for canning to the factory. It is almost impossible under the circumstances, to so regulate the work of the viners that the threshed peas will be delivered to the canning factory only as fast as they can be subjected to the canning operation. The average time, therefore, that the peas remain uncanned after being threshed is as high as four hours and longer. The minimum time is about one hour. Furthermore, the pea canning factories are forced to remain in operation far into the night, since it is essential that all the threshed peas be canned or else stored in water to prevent heating. Water takes practically all the flavor from the peas. This practice is not resorted to therefore, except in cases of absolute necessity.

No practical means has heretofore been devised for removing the pods from the vines mechanically. Peas in the pods may be kept over night or even longer without appreciable loss of flavor or heating if they are stored in shallow containers so piled as to be ventilated. It must be obvious in view of this fact, that the present invention will remedy many of the difficulties now found in the pea canning industry, since by the use of the method and mechanism hereinafter to be disclosed, the pea vines may be stripped free of all pods in picking stations, and the peas in their pods may then be conveyed to the factory and there hulled at a rate corresponding to the ability of the canning machinery to handle the threshed peas. Not only will such peas keep their flavor to an extent impossible to reach in the use of present methods, but the pea canning factory will be enabled to keep more regular hours of operation, and each factory will be able to operate in a greatly enlarged area, since the peas in pods can be transported any reasonable distance either by truck or rail, without heating.

Having thus set forth the primary object of this invention, and having stated the facts necessary for an appreciation of the scope and value of the method and mechanism hereinafter to be described, I will now state further objects sought by this invention.

It is an object of this invention to provide a method and mechanism by which the process of picking pea pods from the vines may be made a continuous operation, so that it will only be necessary to feed in the vines at one end of the machine and withdraw the crop of podded peas at one point and withdraw the stripped vines at another point, the whole operation of podding being continuous and mechanical.

It is a further object of this invention to provide suitable means for causing pea pods to be separated out from the vines in such a manner as to facilitate the picking. It is also an object of this invention to provide suitable picking means, and to provide means for distributing the vines within the machine and loosening them up to facilitate the separation of the pods therefrom as aforesaid.

In the drawings:—

Like parts are identified by the same reference characters throughout the several views.

It will be noted from the foregoing that it is not only the object of this invention to provide a process and a mechanism by which pea pods may be picked from their vines, but it is also an object of this invention to provide means for making the pea picking operation a continuous one. Reduced to its simplest terms, this invention contemplates the use of a riddle 1 mounted for oscillation upon a machine frame 2, means associated with the riddle such as the picking wheels 3 which will pick from the vines upon the riddle the pods depending therefrom, and a suitable conveyor such as the belt 4 which will carry the vines to the riddle. Two methods are shown in the accompanying drawing for making the picking process continuous. In the device shown in Figures 1 to 8, the process is made continuous by providing means which will be disclosed hereinafter for advancing the vines transversely across the riddle after each picking operation in such a way that the vines will be repeatedly subjected to oscillation upon the riddle, and to the picking operation, and will eventually be delivered out of the machine in a direction transverse to their course during operations in the machine. In the device shown in Figure 9, however, I provide a plurality of riddles and the vines are delivered from one riddle to another, preferably passing over each riddle but once and being delivered longitudinally off of the last riddle on to a conveying belt which will remove them from the machine.

The various elements will now be described in detail. It will be understood that the drawings are largely diagrammatic, since the specific mechanical connections by which the various moving elements are actuated form no part of the present invention.

In a construction illustrated in Figures 1 to 8, it is relatively immaterial at what point of the machine the vines are fed into it, since in the operation of the machine the vines are subjected repeatedly to each step of the process. I have shown a trough or chute 5 in dotted lines in Figure 1, and in full lines in Figures 2 and 3, to indicate one point at which vines may enter the machine.

Vines entering the end of the machine through trough 5 are delivered therefrom upon the oscillatory riddle 1 which is constantly vibrating transversely. The upper end of the riddle may be supported upon a transverse shaft 6 which is provided at its end with a forked member 7 in contact with a rotary cam 8, the action of which produces the oscillation of the riddle 1. A bar 9 may be used to aid in supporting the riddle, the free end of which is unsupported in this embodiment of the invention.

Figure 1:
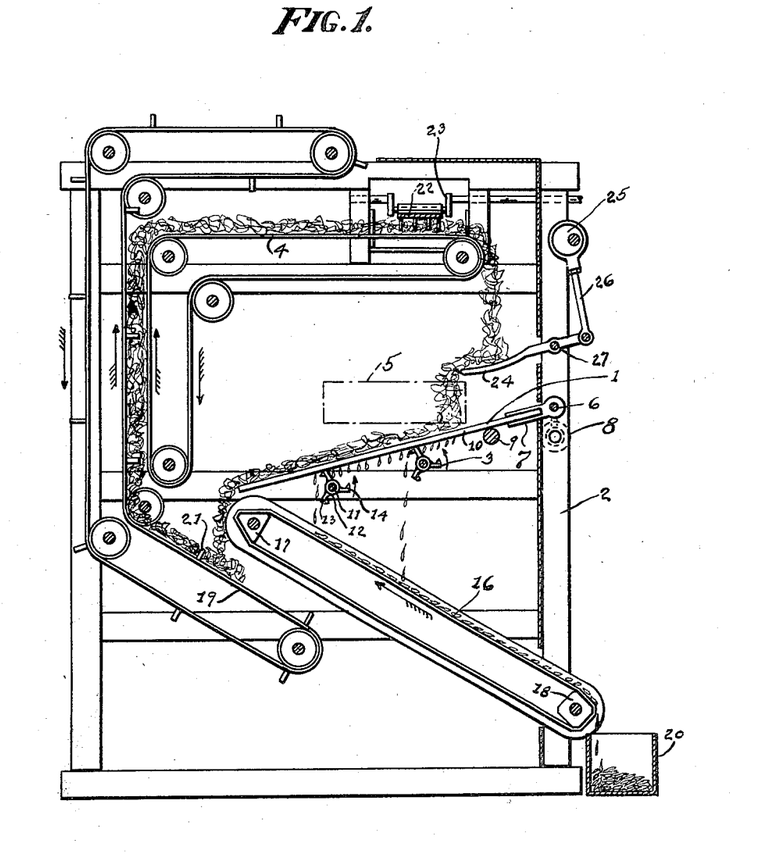
Figure 1 represents an end elevation of one form of apparatus so constructed as to satisfy the objects of this invention.
Figure 2:
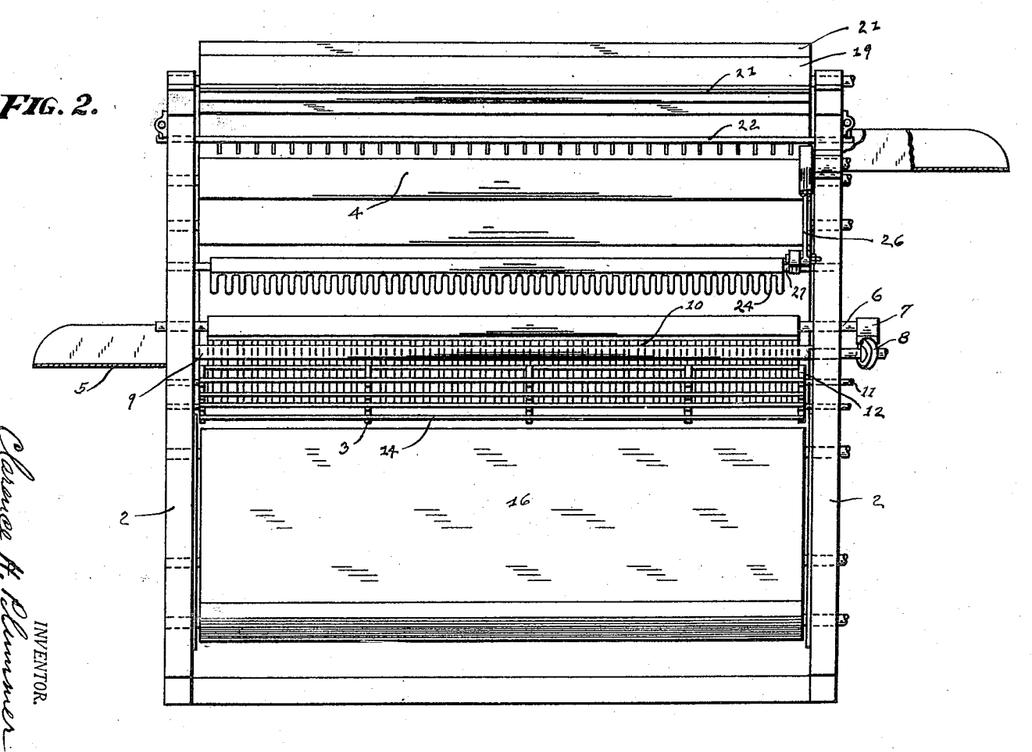
Figure 2 is a side elevation of the same device.
Figure 3:
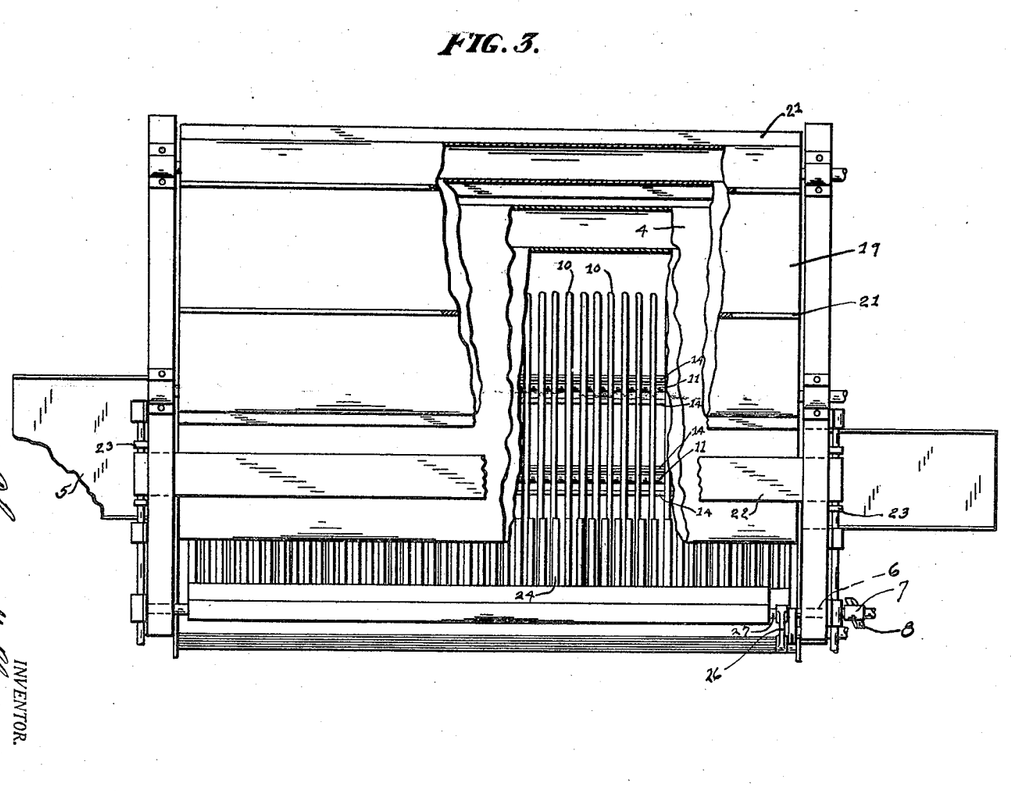
Figure 3 is a plan view of the same apparatus with portions being broken away to expose the interior construction.
Figures 5, 6, 7:
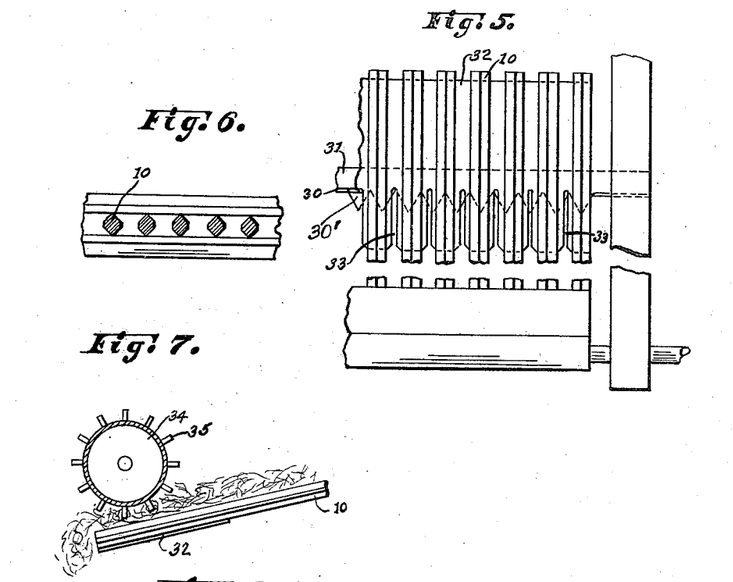
Figure 5 is a fragmentary plan view of the same.
Figure 6 is a detail showing a transverse section through the riddle and illustrating the preferred construction thereof.
Figure 7 is a detail of a further modified construction, showing in end elevation another form of picking device.

The preferred construction of the riddle is indicated in several of the drawings, notably in Figures 3 and 6. It comprises simply a number of parallel rods or fingers 10 which are preferably made six sided as shown in Figure 6. Each of the fingers 10 presents one flat side to each adjacent finger and has a corner uppermost. This construction is preferred for the reason that it has been found to facilitate the separation of the pods from the vines.

Associated with the oscillatory riddle 1 is some form of picking device adapted to sever the stems of pods which are caused, by the oscillation of the rod, to depend from the vines carried thereby. It will be noted that when the vines are placed upon the riddle and subjected to oscillation, they will eventually be shaken into the form of a thin matting of vines which will cover the entire surface of the riddle. Pods carried by the vines so distributed will be caused by the vibration to fall between the fingers 10 of the riddle. The sloping sides of these fingers tend to guide the pods and prevent them from becoming lodged upon the upper surface of a single finger. When the vines are subjected to this treatment, the pods hang down beneath the riddle like ripe grapes in an arbor.

For the purpose of severing the stems and permitting the pods to fall, I have here shown three different devices. The first of these is the picking wheel 3 which appears in Figures 1, 2, 9, and 10. Each wheel 3 is provided with an axle 11 and hub portion 12, and a number of radially projecting arms 13. Although the wheels may be small in diameter, they are extended axially the full length of the machine in order that they may correspond in length with the riddle 1. The picking strips 14 are supported at the ends of the radial arms 13 upon their forward faces. The strips 14 are preferably triangular in form and may, if desired, be faced with a serrated edge of rubber 15 (see Figure 10). It is the function of the strips 14 to engage, by means of a cushioning strip 15, the stem of each depending pod or the pod itself in order to sever the pod from the vine. It has been found that the inertia of the vines and of the hanging pod is such that a sharp blow upon either the pod or the stem is sufficient to jerk the pod from the vine, allowing it to fall upon the belt 16. This belt preferably runs over irregular pulleys 17 and 18 in the manner shown in Figure 1. It is inclined at such an angle that the heavy pods falling thereon will be caused, by the irregular movements of the belt, to travel downwardly upon the belt in a direction opposite to that direction in which the belt is moving. Leaves and other trash which may fall upon the belt will not be dislodged therefrom by the irregular movement caused by pulleys 17 and 18, and will consequently be carried upwardly and discharged upon the conveyor belt 19. The pods traveling down the inclined belt 16 will fall into any suitable container 20.

It will be noted that the vines upon the riddle 1 will be caused, by the oscillation of the riddle and by the inclination thereof, to travel longitudinally of the fingers 10 of the riddle. Having been stripped of all pods which succeeded in finding their way between the fingers 10 of the riddle, the vines are delivered from the riddle upon the conveyor belt 19 which is provided with a series of pins or transverse strips 21 which act in conjunction with the co-operating belt 4 to carry the vines upwardly and thence across the machine toward the upper side of the riddle.

It will be noticed that at one point the conveyor 4 moves the vines in a substantially horizontal plane across the upper portion of the machine. While the vines are thus moving horizontaltally they are acted upon by a reciprocatory rake shown at 22 which moves the vines progressively toward the delivery end of the machine and transversely of their course upon the conveyor 4. The rake 22 also extends from end to end of the machine, and comprises simply a flat plate provided with a plurality of depending teeth, as shown, and mounted upon the crank arms 23 whereby the rake is caused to be engaged with the vines upon the conveyor 4 and to move them laterally of said conveyor.

After being raked laterally upon the broad expanse of the conveyor belt 4, the vines leave this belt and drop upon a tossing rack 24 which has a vertically reciprocatory motion, induced by the action of the cam 25 and connecting rod 26, which oscillates the rack 24 upon the pivot 27. The action produced is similar to the manual tossing of the vines by means of a fork. It results in loosening the vines so that as they fall from the shaking rack 24 to the riddle 1 they may fall upon the riddle in a loose and well distributed mass.

Due to the action of the reciprocatory rake 22, the vines delivered back on to the riddle from the rack 24 will be displaced toward the delivery end of the machine from those vines which are fed to the riddle for the first time through the chute 5. The vibrations of the riddle produce upon the vines thus delivered to it for the second time by the rack 24, the same effect which was originally produced upon these vines. When the vines are thus subjected for a second time to the action of the vibrating riddle and its associated picking devices, most of the pods remaining upon the vines will be removed. The vines will, however, be again carried upwardly by the conveying belts and will be raked still further toward the delivery end of the machine by rake 22, and will again be tossed upon the rack 24 and dropped upon the riddle. It will be obvious that the machine may be made any desired length, and that the vines may be caused to travel across the vibrating riddle any desired number of times. Preferably, however, the vines make at least three trips across the riddle.

Figure 4:
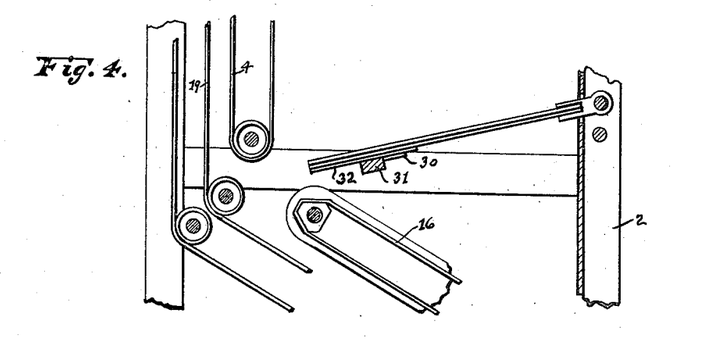
Figure 4 is a detail view showing in end elevation a modified form of construction.
Figure 8:
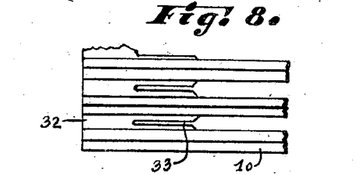
Figure 8 is a fragmentary plan view of the special riddle used in the construction illustrated in Figure 7.

By way of alternative picking devices to be used instead of the rotary pickers 3, I have provided the picking mechanism shown in Figures 4 and 5, and a further modified form illustrated in Figures 7 and 8. The device shown in Figures 4 and 5 comprises a knife 30 supported by a block 31 which serves as a stationary rest for the lower end of the riddle. If desired, the riddle may be provided at its lower end with a plate 32 attached to the lower ends of the fingers 10, and provided with notches 33, one notch or slot in the plate 32 being disposed between each pair of fingers 10. The plate 32 oscillates with the fingers 10 of the riddle, and the notches 33 therefore interact with the teeth 30' of the relatively stationary blade 30 to shear off the stems of such pods as are hanging through between the fingers 10 of the riddle. The notches or slots 33 are preferably of such a width as to admit only stems and not pods, and are of such length as to guard the pods from the action of the knife, thereby ensuring that no pod will be cut in two. Thus the knives will only act upon stems of fully depending pods.

It is also possible to pick the pods from the vines by using in association with the lower end of the vibratory riddle 1 a wheel 34 provided with teeth 35 adapted to engage the vines and tear them forcibly from the riddle (see Figures 7 and 8). If the riddle be now provided with a slotted plate 32, similar to the plate shown in Figures 4 and 5, the stems of the pea pods will be engaged in the slot 33 and the subsequent forcible withdrawal of the vines will cause the pods to be torn by plate 32 from the vines, whereupon they will drop upon a chute or carrier, such as is shown at 16 in Figure 1.

Figures 9, 10:
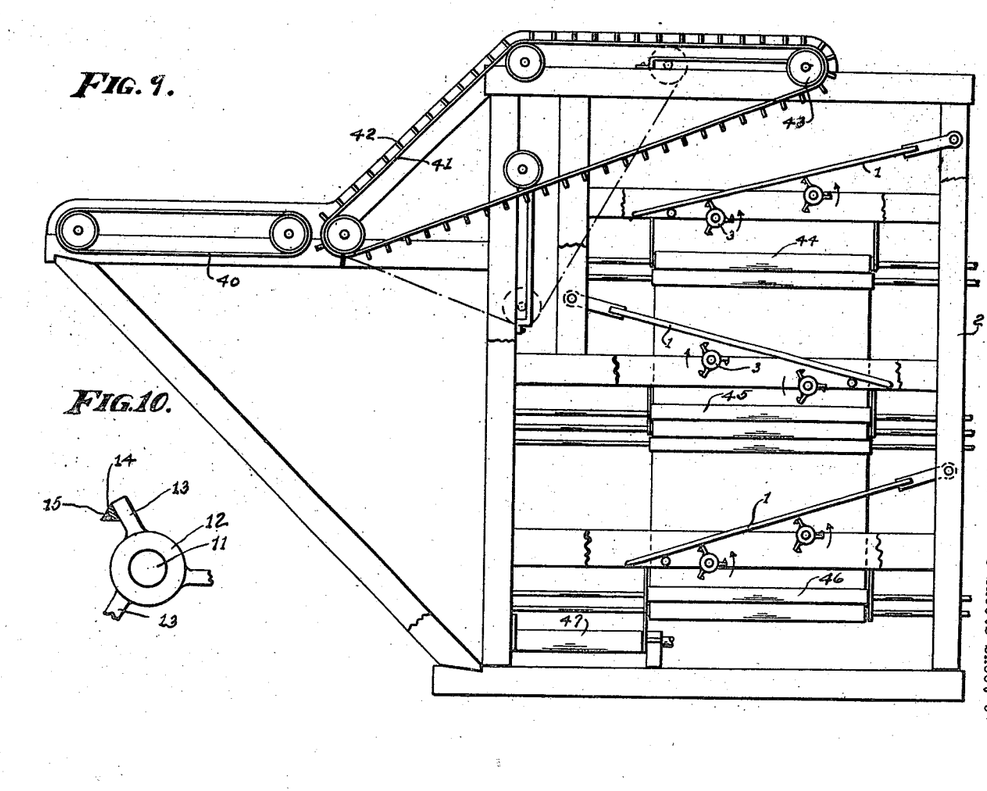
Figure 9 is an end elevation showing a modified construction for the machine frame in which any of the several forms of picking devices herein disclosed may be used.
Figure 10 is a detail on an enlarged scale of the rotary picking device shown in Figures 1 and 9.
Figure 11:
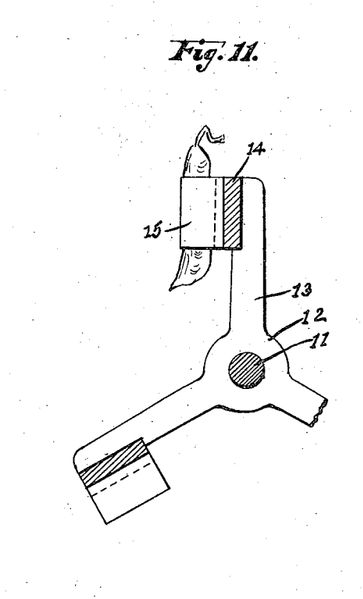
Figures 11 and 12 are details upon a further enlarged scale of a modified form of picking device, showing this device in end and side elevation as it appears when engaging a depending pod.
Figure 12:
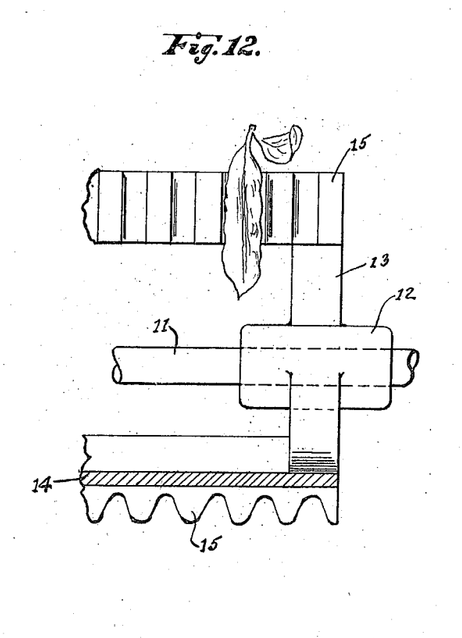

The nature of the device illustrated in Figure 9 has already been indicated. Where the machine frame is built in this form, the necessity of having the oscillatory rake 22, or other similar device to advance the vines progressively through the machine, is done away with. In the device shown in Figure 9 the vines are fed into the machine by dumping them upon the conveyor 40. The conveyor 41 carries the vines upward at a sharp angle and the vines are maintained upon this second conveyor by means of teeth or other vine-engaging means 42 carried thereby. The teeth 42 will tend to pluck from the mass of vines delivered by the conveyor 40 a comparatively thin layer of vines, such as may readily remain in engagement with said teeth. Thus, when the belt 41 delivers the vines over the pulley 43 on to the uppermost of the riddles 1, the vines will be fairly well distributed upon the riddle. It will be understood that each of the riddles 1 will be oscillated in the manner heretofore described, and that any of the picking devices already mentioned may be associated with these riddles. The difference between the device shown in Figure 9 and that shown in Figure 1 and the following drawings, lies principally in the fact that the riddles 1 of Figure 9 are so disposed that the vines will be delivered from one riddle to the next instead of being returned as in Figure 1 to a different place in the same riddle by a suitable conveyer. The device shown in Figure 9 also includes the special means provided by the joint use of two conveyors 40 and 41 and the teeth 42 in the latter conveyor for securing a substantially even distribution of vines upon the riddles, thereby doing away with the shaking rack 24 of Figure 1. Suitable transversely moving belts 44, 45, and 46 must obviously be provided in the device shown in Figure 9 to carry to the rear of the machines such pods as are picked from the vines beneath each of the several riddles. Also, it is necessary to provide means such as is here shown in the form of a conveyor 47 for removing the vines from which all pods have been picked. Obviously, any number of riddles may be superimposed in the manner shown in Figure 9, and so arranged that the vines will be delivered from one riddle to the next until the oscillations of the riddle have brought all the pods within reach of the picking device with which any given machine is equipped.

Obviously, it is also possible to have a a single vibratory riddle of comparatively great length with combined supporting and shearing devices at its free end and other picking devices intermediate its ends. Such an apparatus should have tossing forks similar to 24 between each pair of picking devices. So constructed, the apparatus would involve merely a re-arrangement of elements herein shown.

It is believed that from the foregoing description, the method or process involved in this invention has already been clearly set forth, but a brief summary of the complete process will be given for the sake of clearness.

The vines upon which pods of any sort are growing, are introduced into a pod picking machine and spread out in some manner upon a vibratory riddle which causes the pods to become freed from the vines and to depend downwardly in such a position that they may be acted upon by a picking mechanism. The picking mechanism then severs the stems of the pods which are so hanging from the vines and allows the severed pods to fall into a suitable receptacle. The vines however, will be again subjected to the action of a riddle. It is immaterial in practising the method herein described, whether the vines be returned to the same riddle in the manner shown in Figure 1 or to a second and different riddle as shown in Figure 9. Having been returned to a riddle, and preferably having been loosened either by tossing or by falling from one riddle to another, the vines again undergo the vibratory riddle action which results in the freeing of most of the remaining pods. The pods so freed are severed and carried to containers. The process contemplates the return of the vines to a riddle until practically all of the pods have been removed. It is also contemplated that the process shall be continuous so that the vines will move progressively from one end of the machine to the other and will leave the machine automatically when they have thus been stripped of pods.

It must be clear from the foregoing that the method and mechanism described herein are well adapted to satisfy the objects of this invention.

I claim:

1. The process of removing pods from leguminous plants, including the segregation of the pods from the vines by agitation prior to the severance of the pods.

2. The process of segregating pods from leguminous plants, which comprises supporting the plants at spaced intervals, and subjecting the plants to agitation while so supported, whereby the pods are caused to depend between the points of support.

3. The process of treating leguminous plants to remove the pods therefrom, consisting in supporting the mass of stems and leaves comprising the plants at spaced intervals, subjecting such mass to vibration whereby the pods are caused to depend therefrom between the points of support, severing the stems of pods which are depending below said mass, distributing the plants comprising said mass whereby the stems and leaves of such plants are rearranged in the mass and loosened, and again subjecting the mass to vibration and severing the stems of pods depending therefrom.

4. The process of treating leguminous plants to remove the pods therefrom, which comprises supporting such plants at selected points, subjecting the plants to vibration while so supported, advancing the plants while so supported, picking from the plants the pods depending therefrom, again subjecting the plants to vibration subsequent to the severance of pods therefrom, and again picking such pods as depend from the plants subsequent to the last mentioned vibration.

5. The process of picking pods from plants, which consists in loosely supporting the plants at selected points, subjecting the plants to agitation while thus supported and free to move, and picking the depending pods.

6. In a device for picking the pods of leguminous plants, a slotted member, means for oscillating said member, and means for severing the stems of pods which have fallen through the slots of said member.

7. In a device for picking pods from leguminous plants the combination with a slotted riddle, of means for oscillating said riddle, means for causing the leguminous plants to traverse said riddle, and a picking device associated with said riddle and adapted to sever the stems of pods which fall through said riddle.

8. In a device for picking pods from leguminous plants, the combination with a slotted member adapted to support the plants, of means for subjecting the plants to an oscillatory disturbance while so supported whereby the pods will be caused to depend through said slotted member, and means for severing the stems of depending pods.

9. In a pea picker, an inclined slotted riddle, means for causing pea vines to traverse said riddle, means for shaking the vines upon the riddle whereby the pods will be caused to fall through the slots of said riddle, means associated with the riddle for severing the stems of depending pods, means for continuously advancing vines through the machine across said riddle, whereby the picking operation will be substantially continuous.

10. In a pea picking device, the combination with an inclined slotted riddle, of means for causing pea vines to traverse said riddle, means for shaking the vines upon the riddle whereby the pods will depend through the slots in the riddle, means for severing the stems of depending pods, and means for subsequently depositing the vines upon a riddle for a repetition of the pod freeing process, said vines being advanced toward the point of discharge of the device after each operation whereby the operation of said device may be continuous.

11. In a pea picking device, the combination with a machine frame, of a riddle including a plurality of downwardly inclined fingers disposed transversely of said frame, means for oscillating said riddle longitudinally of the frame, a conveyor adapted to receive the vines from the riddle and restore them to the riddle again, a rake operable to move material carried by the conveyor transversely of the conveyor toward one end of the machine, means for feeding pea vines to the machine at its other end, and means associated with the riddle for severing the stems of pods depending therethrough, said vines being repeatedly subjected to the action of the riddle and progressively advanced through the machine whereby the picking operation is continuous.

12. In a pea picking device, the combination with a machine frame, and means for feeding pea vines at one end thereof, of a riddle including a plurality of downwardly inclined fingers disposed transversely of said frame, means for agitating pea vines upon the riddle, means for severing the stems of pods depending through the riddle from said vines, means for restoring to the riddle the vines delivered therefrom, and means associated with said restoring means for advancing said vines toward the delivery end of the machine.

13. In a pea picking device, the combination with an inclined riddle and means associated with said riddle for severing the stems of pods depending below said riddle, of means adapted to receive the vines delivered at the lower end of the riddle and conveying them to a point adjacent the upper end of the riddle, and means interposed between said conveying means and the upper end of the riddle for tossing the vines.

14. In a pea picking device, the combination with an inclined slotted riddle, of means for subjecting the riddle and vines thereon to vibration, a picker disposed beneath the riddle and arranged to sever pods depending therefrom, and means for subsequently subjecting each mass of vines fed over such riddle to a repetition of the vibration and the action of a picker.

15. In a pea picking device, a vibratile perforate support upon which pea vines are free to move, in combination with a picker disposed adjacent said support and arranged to sever from the vines pods hanging through the perforations in the support.

CLARENCE H. PLUMMER.